United States Patent
Funada (10) Patent No.: US 8,373,713 B2
(45) Date of Patent: Feb. 12, 2013

(54) IMAGE DISPLAY APPARATUS AND CONTROL METHOD THEREOF

(75) Inventor: Masahiro Funada, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 153 days.

(21) Appl. No.: 13/045,906

(22) Filed: Mar. 11, 2011

(65) Prior Publication Data

US 2011/0234608 A1    Sep. 29, 2011

(30) Foreign Application Priority Data

Mar. 24, 2010    (JP) .................................. 2010-068009

(51) Int. Cl.
*G06F 13/28* (2006.01)
*G09G 5/39* (2006.01)

(52) U.S. Cl. ....................... 345/533; 345/531

(58) Field of Classification Search .................. 345/530, 345/531, 533, 534; 382/232, 233, 235, 244
See application file for complete search history.

(56) References Cited

U.S. PATENT DOCUMENTS

| | | | | |
|---|---|---|---|---|
| 5,907,330 A | * | 5/1999 | Simmers | 345/542 |
| 2007/0196023 A1 | * | 8/2007 | Hama et al. | 382/232 |

FOREIGN PATENT DOCUMENTS

JP    2007-072360 A    3/2007

* cited by examiner

*Primary Examiner* — Jacinta M Crawford
(74) *Attorney, Agent, or Firm* — Rossi, Kimms & McDowell LLP (57) ABSTRACT

An image display apparatus includes a memory 1 having a first mode and a second mode in which image data are sequentially written and read per frame and per sub-frame area respectively, a compressor 10 capable of switching a compression output state and an uncompressed output state in which a compression image data and an uncompressed image data are outputted respectively, and a decompressor 20 capable of switching a decompression output state and a non-decompression output state. A controller 6 switches the compressor from the uncompressed output state to the compression output state during a first input vertical blanking period, switches the decompressor from the non-decompression output state to the decompression output state during a first output vertical blanking period immediately after the first input vertical blanking period, and switches the memory from the second mode to the first mode during a first output vertical blanking period.

10 Claims, 9 Drawing Sheets

IMAGE DISPLAY APPARATUS AND CONTROL METHOD THEREOF

BACKGROUND OF THE INVENTION

1. Field of the Invention

The present invention relates to an image display apparatus such as a projector or a monitor.

2. Description of the Related Art

An image signal (image data) having a high resolution may be inputted to an image display apparatus. In this case, the capacity of the image data is enlarged. If the capacity of a frame buffer provided in the image display apparatus increases or the access speed for the frame buffer speeds up in order to cope with the image data having the large amount of capacity, the cost is increased. Therefore, the technology of reducing the capacity of the image data written in the frame buffer by compressing the image data is widely used.

The compression processing is preferably performed by using a simple method such as a bit shift method in view of costs, but such a compression method causes a deterioration of an image quality since it is a lossy color (gradation) compression processing. Therefore, a case where the lossy color compression processing is applied needs to be limited.

For example, Japanese Patent Laid-Open No. 2007-72360 discloses an image display apparatus that switches the application and the non-application of the lossy color compression processing in accordance with whether a keystone adjustment is effective or ineffective in order to limit the case where the lossy color compression processing is applied.

However, in the image display apparatus disclosed in Japanese Patent Laid-Open No. 2007-72360, the disturbance of the image generated at the time of switching the application and the non-application of the lossy color compression processing such as a bit shift needs to be concealed. Therefore, it cannot be used in a case where the switching the application and the non-application of the lossy color compression processing is frequently performed.

SUMMARY OF THE INVENTION

The present invention provides an image display apparatus capable of reducing a disturbance or a discontinuity of an image at the time of switching the application and the non-application of a lossy compression processing.

An image display apparatus as one aspect of the present invention includes a memory including a first mode in which an image data is sequentially written and read per frame and a second mode in which the image data is sequentially written and read per sub-frame area obtained by dividing the frame, a compressor capable of switching a compression output state in which a compression image data generated by compressing an input image data is outputted and an uncompressed output state in which an uncompressed image data without compressing the input image data is outputted as the image data written in the memory, a decompressor capable of switching a decompression output state in which the compression image data read from the memory is decompressed to be outputted and a non-decompression output state in which the uncompressed image data read from the memory is not decompressed to be outputted, and a controller configured to switch the compressor from the uncompressed output state to the compression output state during a first input vertical blanking period, switch the decompressor from the non-decompression output state to the decompression output state at the same time as the first input vertical blanking period or during a first output vertical blanking period immediately after the first input vertical blanking period, and switch the memory from the second mode to the first mode during the first output vertical blanking period or a second output vertical blanking period immediately after the first output vertical blanking period, where a vertical blanking period of an input image to the compressor is defined as an input vertical blanking period and a vertical blanking period of an output image from the decompressor is defined as an output vertical blanking period.

An image display apparatus as another aspect of the present invention includes a memory including a first mode in which an image data is sequentially written and read per frame and a second mode in which the image data is sequentially written and read per sub-frame area obtained by dividing the frame, a compressor capable of switching a compression output state in which a compression image data generated by compressing an input image data is outputted and an uncompressed output state in which an uncompressed image data without compressing the input image data is outputted as the image data written in the memory, a decompressor capable of switching a decompression output state in which the compression image data read from the memory is decompressed to be outputted and a non-decompression output state in which the uncompressed image data read from the memory is not decompressed to be outputted, and a controller configured to switch the memory from the first mode to the second mode during a first output vertical blanking period, switch the compressor from the compression output state to the uncompressed output state during a first input vertical blanking period immediately after the first output vertical blanking period, and switch the decompressor from the decompression output state to the non-decompression output state at the same time as the first input vertical blanking period or during a second output vertical blanking period immediately after the first input vertical blanking period, where a vertical blanking period of an input image to the compressor is defined as an input vertical blanking period and a vertical blanking period of an output image from the decompressor is defined as an output vertical blanking period.

An image display apparatus as another aspect of the present invention includes a memory including a first mode in which an image data is sequentially written and read per frame and a second mode in which the image data is sequentially written and read per sub-frame area obtained by dividing the frame, a compressor capable of switching a compression output state in which a compression image data generated by compressing an input image data is outputted and an uncompressed output state in which an uncompressed image data without compressing the input image data is outputted as the image data written in the memory, a decompressor capable of switching a decompression output state in which the compression image data read from the memory is decompressed to be outputted and a non-decompression output state in which the uncompressed image data read from the memory is not decompressed to be outputted, and a controller configured to switch the compressor from the uncompressed output state to the compression output state and also switch the decompressor from the non-decompression output state to the decompression output state during a first output vertical blanking period or a first input vertical blanking period, and switch the memory from the second mode to the first mode during the first output vertical blanking period and a second output vertical blanking period immediately after the first input vertical blanking period, where a vertical blanking period of an input image to the compressor is defined as an input vertical blanking period and a vertical blanking period of an output image from the decompressor is defined as an output vertical blanking period.

An image display apparatus as another aspect of the present invention includes a memory including a first mode in which an image data is sequentially written and read per frame and a second mode in which the image data is sequentially written and read per sub-frame area obtained by dividing the frame, a compressor capable of switching a compression output state in which a compression image data generated by compressing an input image data is outputted and an uncompressed output state in which an uncompressed image data without compressing the input image data is outputted as the image data written in the memory, a decompressor capable of switching a decompression output state in which the compression image data read from the memory is decompressed to be outputted and a non-decompression output state in which the uncompressed image data read from the memory is not decompressed to be outputted, and a controller configured to switch the memory from the first mode to the second mode during a first output vertical blanking period, and switch the compressor from the compression output state to the uncompressed output state and also switch the decompressor from the decompression output state to the non-decompression output state during a second output vertical blanking period immediately after the first output vertical blanking period or a first input vertical blanking period immediately after the second output vertical blanking period, where a vertical blanking period of an input image to the compressor is defined as an input vertical blanking period and a vertical blanking period of an output image from the decompressor is defined as an output vertical blanking period.

A method as another aspect of the present invention is a method of controlling an image display apparatus including a memory including a first mode in which an image data is sequentially written and read per frame and a second mode in which the image data is sequentially written and read per sub-frame area obtained by dividing the frame, a compressor capable of switching a compression output state in which a compression image data generated by compressing an input image data is outputted and an uncompressed output state in which an uncompressed image data without compressing the input image data is outputted as the image data written in the memory, and a decompressor capable of switching a decompression output state in which the compression image data read from the memory is decompressed to be outputted and a non-decompression output state in which the uncompressed image data read from the memory is not decompressed to be outputted. The method includes the steps of switching the compressor from the uncompressed output state to the compression output state during a first input vertical blanking period, switching the decompressor from the non-decompression output state to the decompression output state at the same time as the first input vertical blanking period or during a first output vertical blanking period immediately after the first input vertical blanking period, and switching the memory from the second mode to the first mode during the first output vertical blanking period or a second output vertical blanking period immediately after the first output vertical blanking period, where a vertical blanking period of an input image to the compressor is defined as an input vertical blanking period and a vertical blanking period of an output image from the decompressor is defined as an output vertical blanking period.

A method as another aspect of the present invention is a method of controlling an image display apparatus including a memory including a first mode in which an image data is sequentially written and read per frame and a second mode in which the image data is sequentially written and read per sub-frame area obtained by dividing the frame, a compressor capable of switching a compression output state in which a compression image data generated by compressing an input image data is outputted and an uncompressed output state in which an uncompressed image data without compressing the input image data is outputted as the image data written in the memory, and a decompressor capable of switching a decompression output state in which the compression image data read from the memory is decompressed to be outputted and a non-decompression output state in which the uncompressed image data read from the memory is not decompressed to be outputted. The method includes the steps of switching the memory from the first mode to the second mode during a first output vertical blanking period, switching the compressor from the compression output state to the uncompressed output state during a first input vertical blanking period immediately after the first output vertical blanking period, and switching the decompressor from the decompression output state to the non-decompression output state at the same time as the first input vertical blanking period or during a second output vertical blanking period immediately after the first input vertical blanking period, where a vertical blanking period of an input image to the compressor is defined as an input vertical blanking period and a vertical blanking period of an output image from the decompressor is defined as an output vertical blanking period.

A method as another aspect of the present invention includes a method of controlling an image display apparatus including a memory including a first mode in which an image data is sequentially written and read per frame and a second mode in which the image data is sequentially written and read per sub-frame area obtained by dividing the frame, a compressor capable of switching a compression output state in which a compression image data generated by compressing an input image data is outputted and an uncompressed output state in which an uncompressed image data without compressing the input image data is outputted as the image data written in the memory, and a decompressor capable of switching a decompression output state in which the compression image data read from the memory is decompressed to be outputted and a non-decompression output state in which the uncompressed image data read from the memory is not decompressed to be outputted. The method includes the steps of switching the compressor from the uncompressed output state to the compression output state and also switching the decompressor from the non-decompression output state to the decompression output state during a first output vertical blanking period or a first input vertical blanking period, and switching the memory from the second mode to the first mode during the first output vertical blanking period and a second output vertical blanking period immediately after the first input vertical blanking period, where a vertical blanking period of an input image to the compressor is defined as an input vertical blanking period and a vertical blanking period of an output image from the decompressor is defined as an output vertical blanking period.

A method as another aspect of the present invention is a method of controlling an image display apparatus including a memory including a first mode in which an image data is sequentially written and read per frame and a second mode in which the image data is sequentially written and read per sub-frame area obtained by dividing the frame, a compressor capable of switching a compression output state in which a compression image data generated by compressing an input image data is outputted and an uncompressed output state in which an uncompressed image data without compressing the input image data is outputted as the image data written in the memory, and a decompressor capable of switching a decompression output state in which the compression image data read from the memory is decompressed to be outputted and a non-decompression output state in which the uncompressed image data read from the memory is not decompressed to be outputted. The method includes the steps of switching the memory from the first mode to the second mode during a first output vertical blanking period, and switching the compressor from the compression output state to the uncompressed output state and also switching the decompressor from the decompression output state to the non-decompression output state during a second output vertical blanking period immediately after the first output vertical blanking period or a first input vertical blanking period immediately after the second output vertical blanking period, where a vertical blanking period of an input image to the compressor is defined as an input vertical blanking period and a vertical blanking period of an output image from the decompressor is defined as an output vertical blanking period.

Further features and aspects of the present invention will become apparent from the following description of exemplary embodiments with reference to the attached drawings.

DESCRIPTION OF THE PREFERRED EMBODIMENTS

Exemplary embodiments of the present invention will hereinafter be described with reference to the accompanying drawings.

[Embodiment 1]

Figure 1:
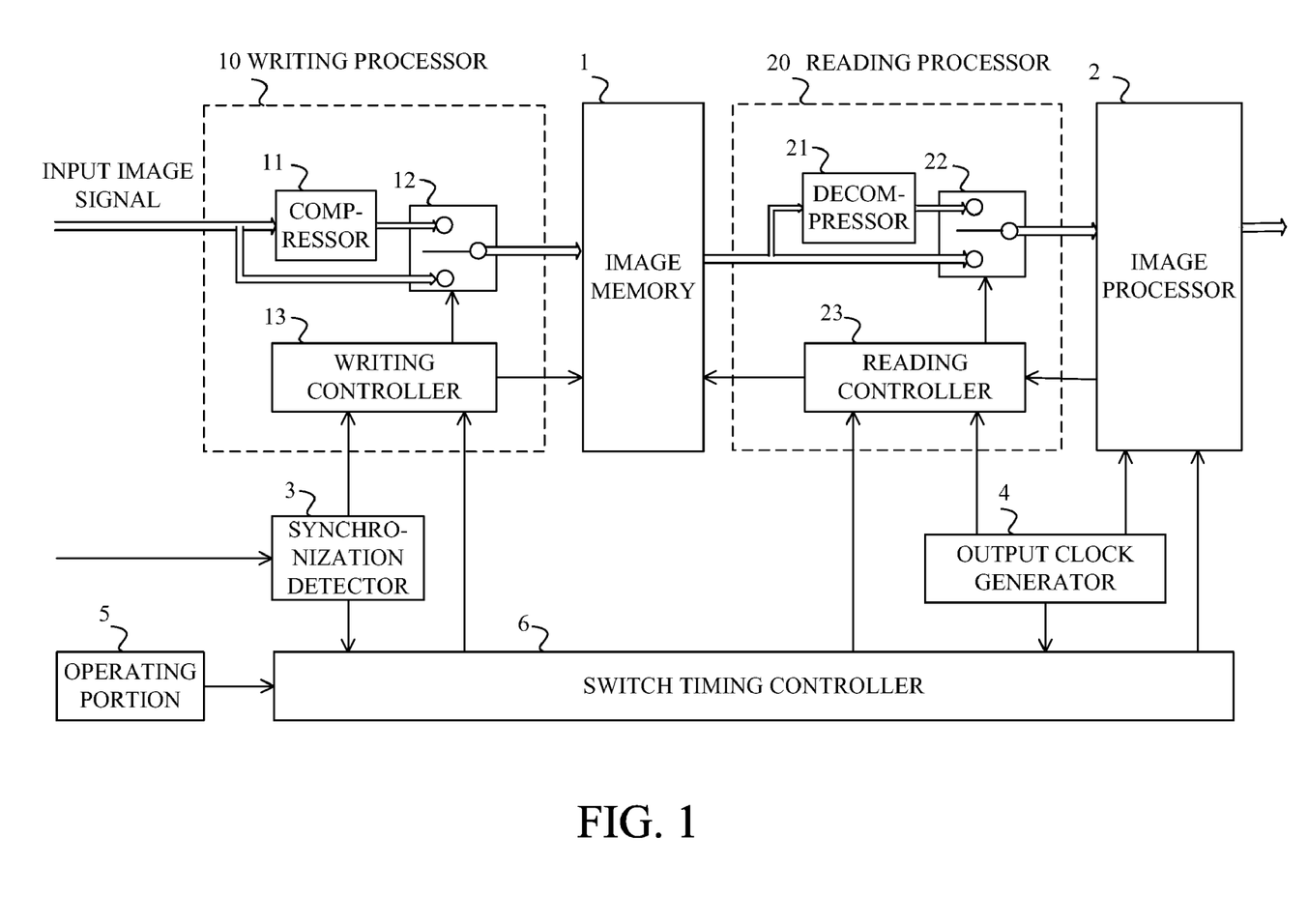
FIG. 1 is a block diagram illustrating a configuration of an image display apparatus that is Embodiment 1 of the present invention.

FIG. 1 illustrates a configuration of a part related to a processing of an image signal (image data) in an image display apparatus that is Embodiment 1 of the present invention. Various kinds of image display apparatuses such as an image projection apparatus of a liquid crystal projector, a DLP (Digital Light Processing) projector, or the like, and a direct-view liquid crystal monitor are included as the image display apparatus.

The image display apparatus includes a writing processor (a compressor) 10, an image memory (a memory) 1, a reading processor (a decompressor) 20, an image processor 2, a synchronization detector 3, an output clock generator 4, an operating portion 5, and a switch timing controller (a controller) 6.

The writing processor 10, as indicated by a dashed line in FIG. 1, includes a compressor 11, a compression application switch 12, and a writing controller 13. The writing processor 10 converts a format of the image data written in the image memory 1 and controls a writing mode and a writing address in the image memory 1.

The compressor 11 compresses the image data (an input image data) inputted as an input image signal to generate a compression image data whose size is smaller than that of the input image data. The compression means a lossy compression processing such as a resolution conversion, a bit width reduction, or a color subtraction.

The compression application switch 12 can be switched between a state of selecting a compression route where the input image data is written in the image memory 1 via the compressor 11 and a state of selecting a detour route where it is written in the image memory 1 bypassing the compressor 11. The state of selecting the compression route corresponds to a compression output state, and the state of selecting the detour route corresponds to an uncompressed output state. An output of the compression application switch 12 is a compression image data when the input image data is obtained via the compressor 11, and on the other hand an output of the compression application switch 12 is an uncompressed image data when the input image data bypasses the compressor 11.

The writing controller 13 controls the switching of the writing mode of the image memory 1 and the switching of the compression application switch 12. The writing mode includes a first access mode (a first mode) and a second access mode (a second mode). In the first access mode, the image data is sequentially written at a writing address which is different per frame. The image data of each frame is stored only for one vertical synchronization period. In the second access mode, each frame of the image data is divided into a sub-frame area (for example, a half area of one frame) including a plurality of lines, and is sequentially written at a writing address which is different per sub-frame area. The image data of each sub-frame area is stored only for one sub-frame period.

The writing controller 13 appropriately controls the number of writing pixels per access to the image memory 1 in accordance with the difference of an amount of the image data depending on the route selected by the compression application switch 12, and specifies the writing address to the image memory 1 in accordance with the number of the writing pixels. The timing of changing the writing mode is determined by the switch timing controller 6 based on the synchronization signal outputted from the synchronization detector 3.

In the image memory 1, the image data (the compression image data or the uncompressed image data) outputted from the compression application switch 12 is written at the writing address specified by the writing controller 13. The image memory 1 outputs the image data at the address that the reading controller 23 described below specifies for the reading processor 20.

The reading processor 20, as indicated by a dashed line in FIG. 1, includes a decompressor 21, a decompression application switch 22, and a reading controller 23. The reading processor 20 converts a format of the image data read from the image memory 1 and controls the reading mode and the address from the image memory 1.

The decompressor 21 decompresses the image data (the compression image data) compressed by the compressor 11 to the image data of the original size (a decompression image data).

The decompression application switch 22 can be switched between a state of selecting the decompression route where the compression image data read from the image memory 1 is outputted via the decompressor 21 (a decompression output state) and a state of selecting a detour route where it is outputted bypassing the decompressor 21 (a non-decompression output state). The image data outputted from the decompression application switch 22 is inputted to the image processor 2.

The reading controller 23 controls the switching of the reading mode of the image memory 1 and the switching of the decompression application switch 22. The reading mode includes a first access mode (a first mode) and a second access mode (a second mode) that correspond to the first access mode and the second access mode as the writing mode described above, respectively. The image data is sequentially read from the image memory 1 per frame in the first access mode in the reading mode, and the image data is sequentially read per sub-frame in the second access mode.

The image data read from the image memory 1 corresponds to the image data of the image area required by the image processor 2. The reading controller 23 appropriately controls the number of reading pixels per access to the image memory 1 in accordance with the difference of an amount of the image data depending on the route selected by the decompression application switch 22, and specifies the reading address from the image memory 1 in accordance with the number of the reading pixels. The timing of changing the reading mode is determined by the switch timing controller 6 based on the synchronization signal outputted from the output clock generator 4.

The switch timing controller 6, as described above, controls the writing mode of the image memory 1 and the switching (the switch timing) of the compression application switch 12 via the writing controller 13 based on the synchronization signal outputted from the synchronization detector 3. Moreover, the switch timing controller 6, as described above, controls the reading mode of the image memory 1 and the switching of the decompression application switch 22 (the switch timing) via the reading controller 23 based on the synchronization signal outputted from the output clock generator 4.

The image processor 2 performs a resolution conversion processing that coverts the image data outputted from the reading processor 20 into an image data having a magnification set by the switch timing controller 6. The image data after the resolution conversion processing is outputted to a display that is not illustrated (for example, a liquid crystal projector or a liquid crystal panel if it is a liquid crystal monitor), and an image in accordance with the set magnification is displayed on the display.

When the extent of the reduction or the enlargement in the reduction conversion processing is enlarged, the time required for storing the image data from writing to reading times in the image memory 1 needs to be longer. Therefore, the first access mode that can store the image data for a longer time is more advantageous than the second access mode. In other words, when a larger amount of the reduction or enlargement ratio is achieved, the writing or the reading by the first access mode for the image memory 1 needs to be performed.

A synchronization component of the input image signal is inputted to the synchronization detector 3. The synchronization detector 3 supplies horizontal and vertical synchronization signals to the writing controller 13, and supplies the vertical synchronization signal to the switch timing controller 6.

The output clock generator 4 outputs a pixel clock that is used for operating the image memory 1 and each latter part of it, the horizontal synchronization signal, and the vertical synchronization signal.

The operating portion 5 includes an operating member such as a button, a dial, a keyboard, or a pointing device to be operated by a user to set the magnification of the reduction or the enlargement of the image displayed on the display.

The switch timing controller 6, regarding the input from the operating portion 5 as a trigger, instructs the selections (the switches) of the access mode of the image memory 1 and the routes of the compression application switch 12 and the decompression application switch 22, and also performs the setting of the magnification of the reduction or enlargement for the image processor 2. The selections of the access mode and the routes are divided into the following three cases, depending on the magnitude relation between the size of the input image data (an amount of the image data) and the size of the image memory 1 (a capacity) and a set magnification of the image processor 2.

The first case is a case where the size of the input image data is smaller than the size of the image memory 1. In this case, the first access mode that can store the image data of one frame only for one vertical period is selected, and both the compression application switch 12 and the decompression application switch 22 select the detour routes.

The second case is a case where the size of the input image data is larger than the size of the image memory 1 and the magnification in the image processor 2 is the same magnification or near the same magnification. In this case, the reduction of the image data size by the compression route is not necessary. Therefore, the second access mode in which the image data of the one sub-frame is stored only for one sub-frame period is selected, and both the compression application switch 12 and the decompression application switch 22 select the detour route.

The third case is a case where the size of the input image data is larger than the size of the image memory 1 and the magnification in the image processor 2 is significantly different from the same magnification. In this case, since the magnification is significantly different from the same magnification, the time required for storing the image data in the image memory 1 needs to be longer, the reduction of the image data size by the compression route is necessary. Therefore, the first access mode in which the image data of one frame can be stored only for one vertical period is selected, and the compression application switch 12 and the decompression application switch 22 select the compression route and the decompression route, respectively.

Thus, the selection of the access mode and the selection of the compression/decompression/detour route are appropriately performed to reduce a case where an image quality is deteriorated by the lossy compression processing performed by the compressor 12.

Next, referring to FIGS. 2A and 2B, the timing (a control method) of performing the switches of the access mode and the compression/decompression/detour route by the switch timing controller 6 will be described. The switch timing controller 6 performs the following processing (step) in accordance with a computer program stored in an embedded memory.

When the magnification of the reduction or the enlargement is changed in a case where the size of the input image data is larger than the size of the image memory 1, there is a case where the access mode and the route need to be switched in accordance with the magnification. The switching is instantly performed while the image is displayed, and also it is preferable that the discontinuity or the disturbance of the image is not generated or is small to be invisible.

Figure 2A:
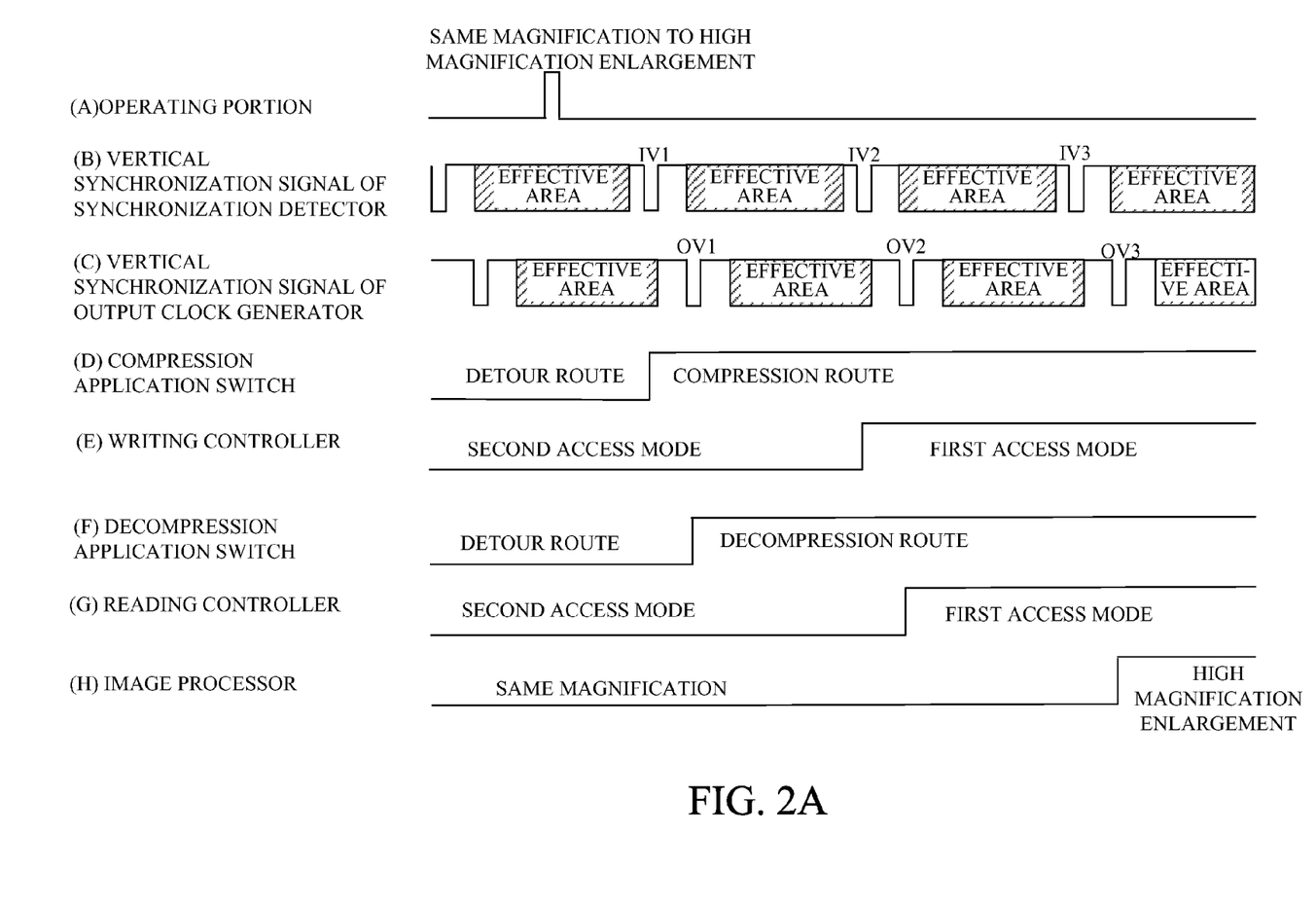
FIGS. 2A and 2B are diagrams illustrating switch timings in the image display apparatus of Embodiment 1.

FIG. 2A illustrates operation timings of (D) the compression application switch 12, (E) the writing controller 13, (F) the decompression application switch 22, and (G) the reading controller 23, and (H) the image processor 2 when the operation of instructing the enlargement from the same magnification to a high magnification is performed by (A) the operating portion 5. The processing of FIG. 2A corresponds to claims 1 and 7.

Each operation timing needs to be performed during a vertical blanking period (an input vertical blanking period) of the input image signal inputted to the writing processor 10 and a vertical blanking period (an output vertical blanking period) of the output image signal outputted from the reading processor 20. In the present embodiment, an interrupt by (B) the vertical synchronization signal outputted from the synchronization detector 3 is used as an indicator of an incoming timing of the input vertical blanking period. Moreover, an interrupt by (C) the vertical synchronization signal outputted from the output clock generator 4 is used as an indicator of an incoming timing of the output vertical blanking period.

After the enlargement instruction operation from the same magnification to the high magnification is performed by the operating portion 5, (B) the vertical synchronization signal outputted from the synchronization detector 3 is sequentially defined as IV1, IV2, IV3, and the like, and (C) the vertical synchronization signal outputted from the output clock generator 4 is sequentially defined as OV1, OV2, OV3, and the like. OV1, OV2, and OV3 are outputted next to (immediately after) IV1, IV2, and IV3, respectively. Instead of this, however, OV1, OV2, and OV3 may be outputted at the same time as IV1, IV2, and IV3, respectively.

During IV1 (the first input vertical blanking period), (D) the compression application switch 12 is switched from the detour route to the compression route via the writing controller 13.

During OV1 (the first output vertical blanking period immediately after the first input vertical blanking period), (F) the decompression application switch 22 is switched from the detour route to the decompression route via the reading controller 23.

During IV2, the access mode (the writing mode) to the image memory 1 is switched from the second access mode to the first access mode via (E) the writing controller 13.

During OV2 (the second output vertical blanking period immediately after the first output vertical blanking period), the access mode (the reading mode) for the image memory 1 is switched from the second access mode to the first access mode via (G) the reading controller 23.

During OV3, the set magnification in (H) the image processor 2 is switched from the same magnification to the high magnification.

The processings of switching the access mode and the compression/decompression/detour route described above are performed to be able to eliminate or reduce the disturbance or the discontinuity of the image in enlarging the image displayed on the display from the same magnification to the high magnification (in the switching where the lossy compression processing is applied).

If there is a room for the processing capacity, the processing that is to be performed during IV2 is also performed during IV1 and the processings that are to be performed during OV2 and OV3 are also performed during OV1 to be able to shorten the time required for the total of the switch processings.

Figure 2B:
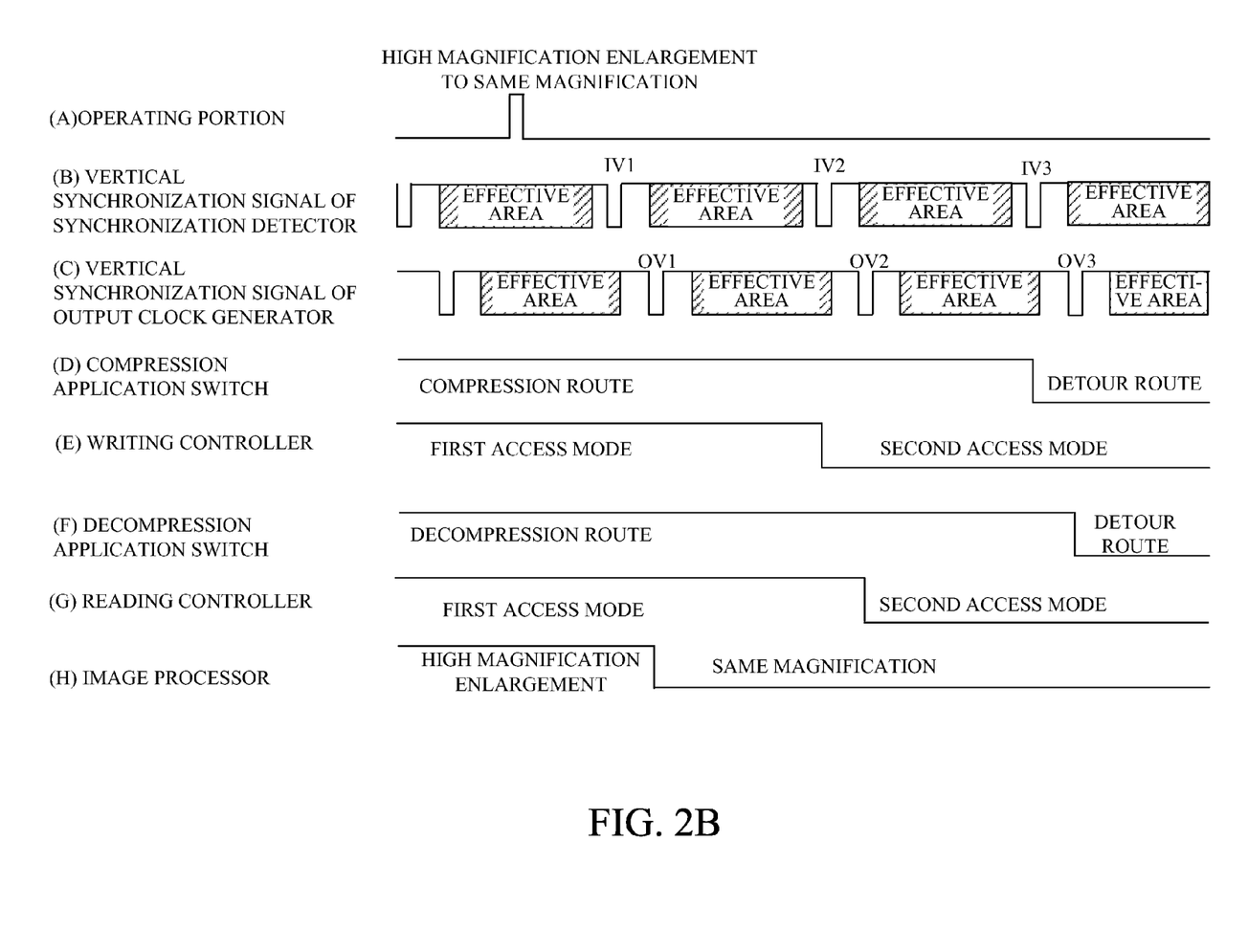

FIG. 2B illustrates operation timings of (D) the compression application switch 12, (E) the writing controller 13, (F) the decompression application switch 22, (G) the reading controller 23, and (H) the image processor 2 when the operation that instructs the reduction from the high magnification to the same magnification is performed by (A) the operating portion 5. In this case, the switching may be performed in the order reverse of a case where the enlargement instruction operation from the same magnification to the high magnification is performed. The processing in FIG. 2B corresponds to claims 2 and 8.

During OV1, a set magnification in (H) the image processor 2 is switched from the high magnification to the same magnification.

During IV2, the access mode for the image memory 1 is switched from the first access mode to the second access mode via (E) the writing controller 13.

During OV2 (the first output vertical blanking period), the access mode for the image memory 1 is switched from the first access mode to the second access mode via (G) the reading controller 23.

During IV3 (the first input vertical blanking period immediately after the first output vertical blanking period), (D) the compression application switch 12 is switched from the compression route to the detour route via the writing controller 13.

During OV3 (the second output vertical blanking period immediately after the first input vertical blanking period), (F) the decompression application switch 22 is switched from the decompression route to the detour route via the reading controller 23.

The switch processings of the access mode and the compression/decompression/detour route described above are performed to be able to eliminate or reduce the discontinuity or the disturbance of the image in reducing the image displayed on the display from the high magnification to the same magnification (in the switching where the lossy compression processing is not applied).

If there is a room for the processing capacity, the processing that is to be performed during IV2 is also performed during IV3 and the processing that is to be performed during OV3 is also performed during IV3 when OV3 is outputted at the same time as IV3 to be able to shorten the time required for the total of the switch processings.

[Embodiment 2]

Figure 3:
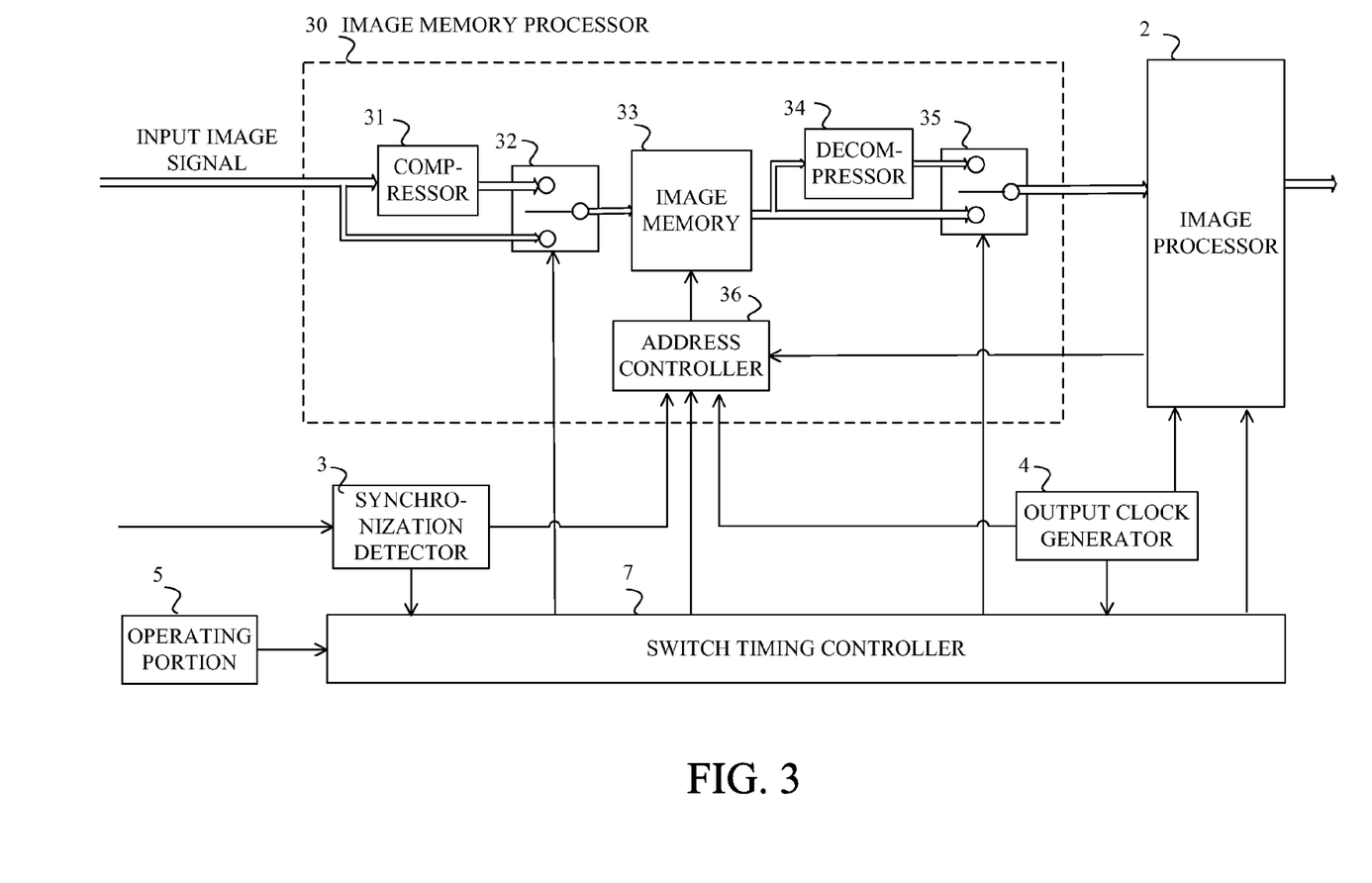
FIG. 3 is a block diagram illustrating a configuration of an image display apparatus that is Embodiment 2 of the present invention.

FIG. 3 illustrates a configuration of a part related to a processing of an image signal (an image data) of an image display apparatus that is Embodiment 2 of the present invention. The image display apparatus includes an image memory processor (a memory, a compressor, and a decompressor) 30, an image processor 2, a synchronization detector 3, an output clock generator 4, an operating portion 5, and a switch timing controller (a controller) 7. The image processor 2, the synchronization detector 3, the output clock generator 4, and the operating part 5 are the same as those of Embodiment 1.

The image memory processor 30, as indicated by a dashed line in FIG. 3, includes a compressor 31, a compression application switch 32, an image memory 33, a decompressor 34, a decompression application switch 35, and an address controller 36. The image memory processor 30 stores the input image data in the image memory 33, and outputs the image data required from the image processor 2. The compressor 31, the compression application switch 32, the image memory 33, the decompressor 34, and the decompression application switch 35 have the same functions as those of the compressor 11, the compression application switch 12, the image memory 1, the decompressor 21, and the decompression application switch 22 described in Embodiment 1, respectively.

The address controller 36 has a combined function of the writing controller 13 and the reading controller 23 described in Embodiment 1 to control the writing address (the writing mode) and the reading address (the reading mode) for the image memory 33. Each of the writing mode and the reading mode, similarly to Embodiment 1, includes a first access mode and a second access mode. The switching of the first access mode and the second access mode is controlled by the switch timing controller 7.

The switch timing controller 7, regarding the input from the operating portion 5 as a trigger, instructs the selections (the switches) of the access mode of the image memory 33 and the routes of the compression application switch 32 and the decompression application switch 35, and also performs the setting of the magnification of the reduction or enlargement for the image processor 2.

Next, referring to FIGS. 4A and 4B, the timing (a control method) of performing the switches of the access mode and the compression/decompression/detour route by the switch timing controller 7 will be described. The switch timing controller 7 performs the following processing (step) in accordance with a computer program stored in an embedded memory.

Figure 4A:
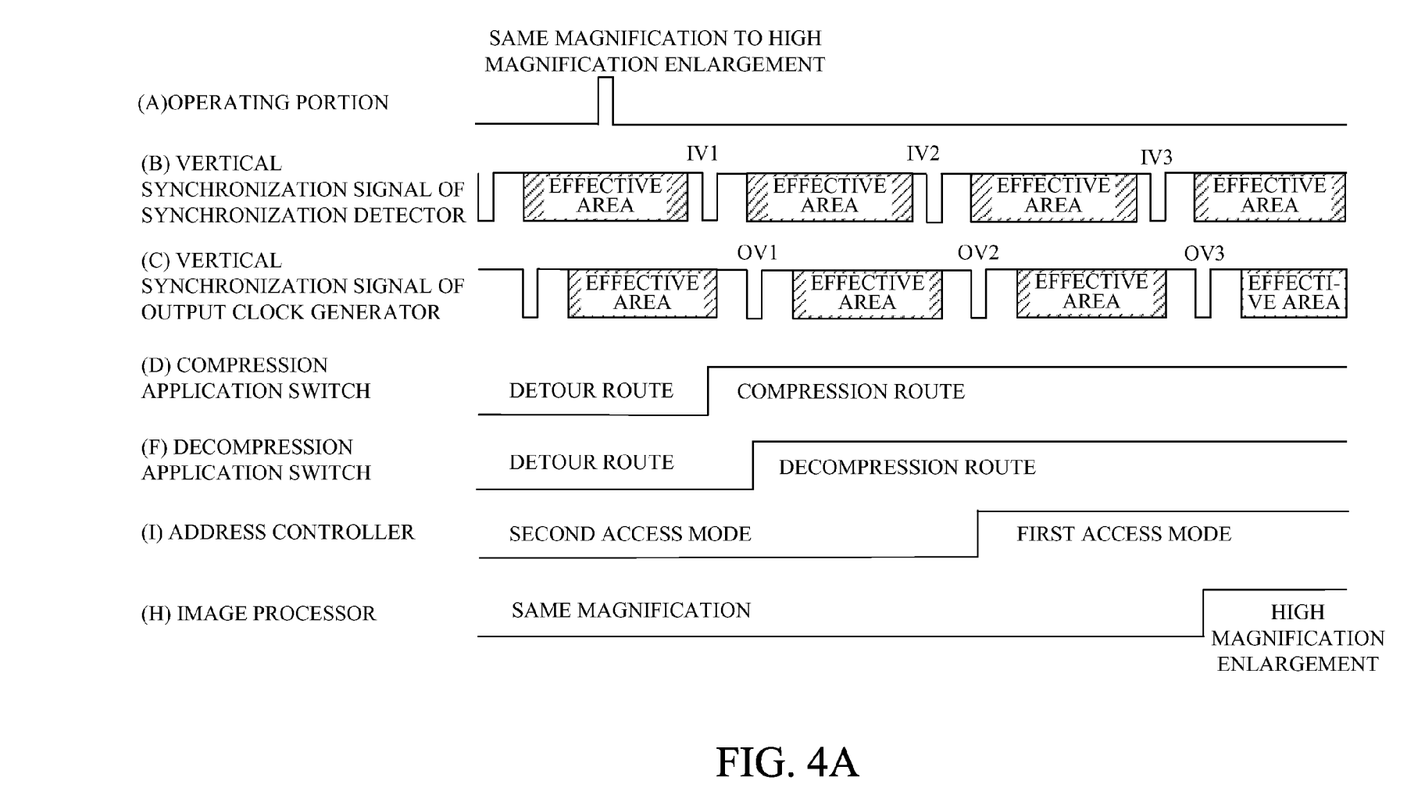
FIGS. 4A and 4B are diagrams illustrating switch timings in the image display apparatus of Embodiment 2.

FIG. 4A illustrates operation timings of (D) the compression application switch 32, (F) the decompression application switch 35, (I) the address controller 36, and (H) the image processor 2 when the operation of instructing the enlargement from the same magnification to the high magnification is performed by (A) the operating portion 5. The processing of FIG. 4A corresponds to claims 1 and 7.

Each operation timing needs to be performed during a vertical blanking period (an input vertical blanking period) of the input image signal inputted to the image memory processor 30 and a vertical blanking period (an output vertical blanking period) of the output image signal outputted from the image memory processor 30. Also in the present embodiment, an interrupt by (B) the vertical synchronization signal outputted from the synchronization detector 3 is used as an indicator of an incoming timing of the input vertical blanking period. Moreover, an interrupt by (C) the vertical synchronization signal outputted from the output clock generator 4 is used as an indicator of an incoming timing of the output vertical blanking period.

After the enlargement instruction operation from the same magnification to the high magnification is performed by the operating portion 5, (B) the vertical synchronization signal outputted from the synchronization detector 3 is sequentially defined as IV1, IV2, IV3, and the like, and (C) the vertical synchronization signal outputted from the output clock generator 4 is sequentially defined as OV1, OV2, OV3, and the like. OV1, OV2, and OV3 are outputted next to (immediately after) IV1, IV2, and IV3, respectively. Instead of this, however, OV1, OV2, and OV3 may be outputted at the same time as IV1, IV2, and IV3, respectively.

During IV1 (the first input vertical blanking period), (D) the compression application switch 32 is switched from the detour route to the compression route.

During OV1 (the first output vertical blanking period immediately after the first input vertical blanking period), (F) the decompression application switch 35 is switched from the detour route to the decompression route.

During OV2 (the second output vertical blanking period immediately after the first output vertical blanking period), the access mode (the writing/reading mode) for the image memory 33 is switched from the second access mode to the first access mode via (I) the address controller 36.

During OV3, the set magnification in (H) the image processor 2 is switched from the same magnification to the high magnification.

The processings of switching the access mode and the compression/decompression/detour route described above are performed to be able to eliminate or reduce the discontinuity or the disturbance of the image in enlarging the image displayed on the display from the same magnification to the high magnification.

If there is a room for the processing capacity, the processings that are to be performed during OV2 and OV3 are also performed during OV1 to be able to shorten the time required for the total of the switch processings.

Figure 4B:
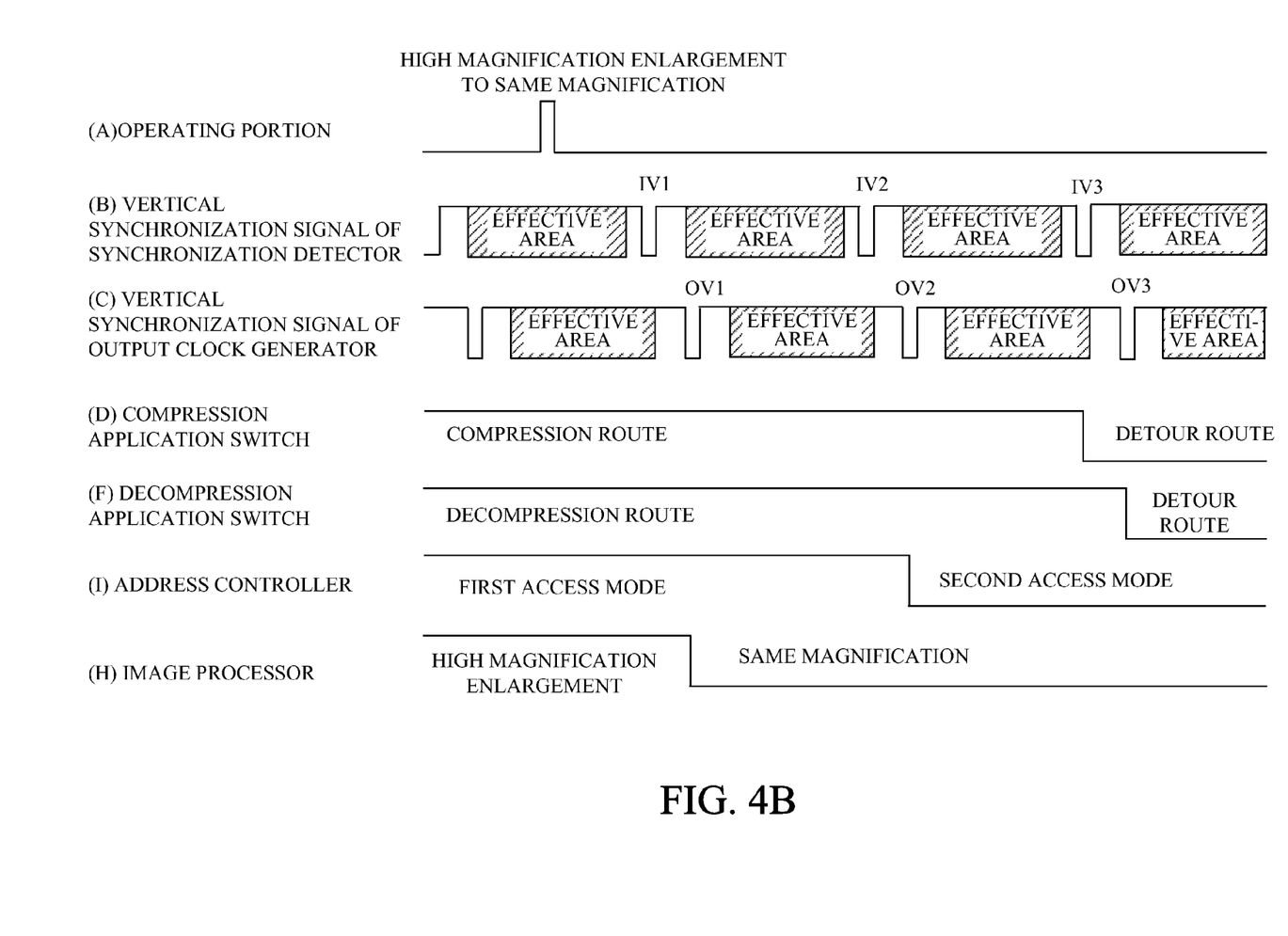

FIG. 4B illustrates operation timings of (D) the compression application switch 32, (F) the decompression application switch 35, (I) the address controller 36, and (H) the image processor 2 when the operation that instructs the reduction from the high magnification to the same magnification is performed by (A) the operating portion 5. In this case, the switching may be performed in the order reverse of a case where the enlargement instruction operation from the same magnification to the high magnification is performed. The processing in FIG. 4B corresponds to claims 2 and 8.

During OV1, a set magnification in (H) the image processor 2 is switched from the high magnification to the same magnification.

During OV2 (the first output vertical blanking period), the access mode (the writing/reading mode) for the image memory 33 is switched from the first access mode to the second access mode via (I) the address controller 36.

During IV3 (the first input vertical blanking period immediately after the first output vertical blanking period), (D) the compression application switch 32 is switched from the compression route to the detour route.

During OV3 (the second output vertical blanking period immediately after the first input vertical blanking period), (F) the decompression application switch 35 is switched from the decompression route to the detour route.

The switch processings of the access mode and the compression/decompression/detour route described above are performed to be able to eliminate or reduce the discontinuity or the disturbance of the image in reducing the image displayed on the display from the high magnification to the same magnification.

If there is a room for the processing capacity and OV3 is outputted at the same time as IV3, the processing that is to be performed during OV3 is also performed during IV3 to be able to shorten the time required for the total of the switch processings.

[Embodiment 3]

Figure 5:
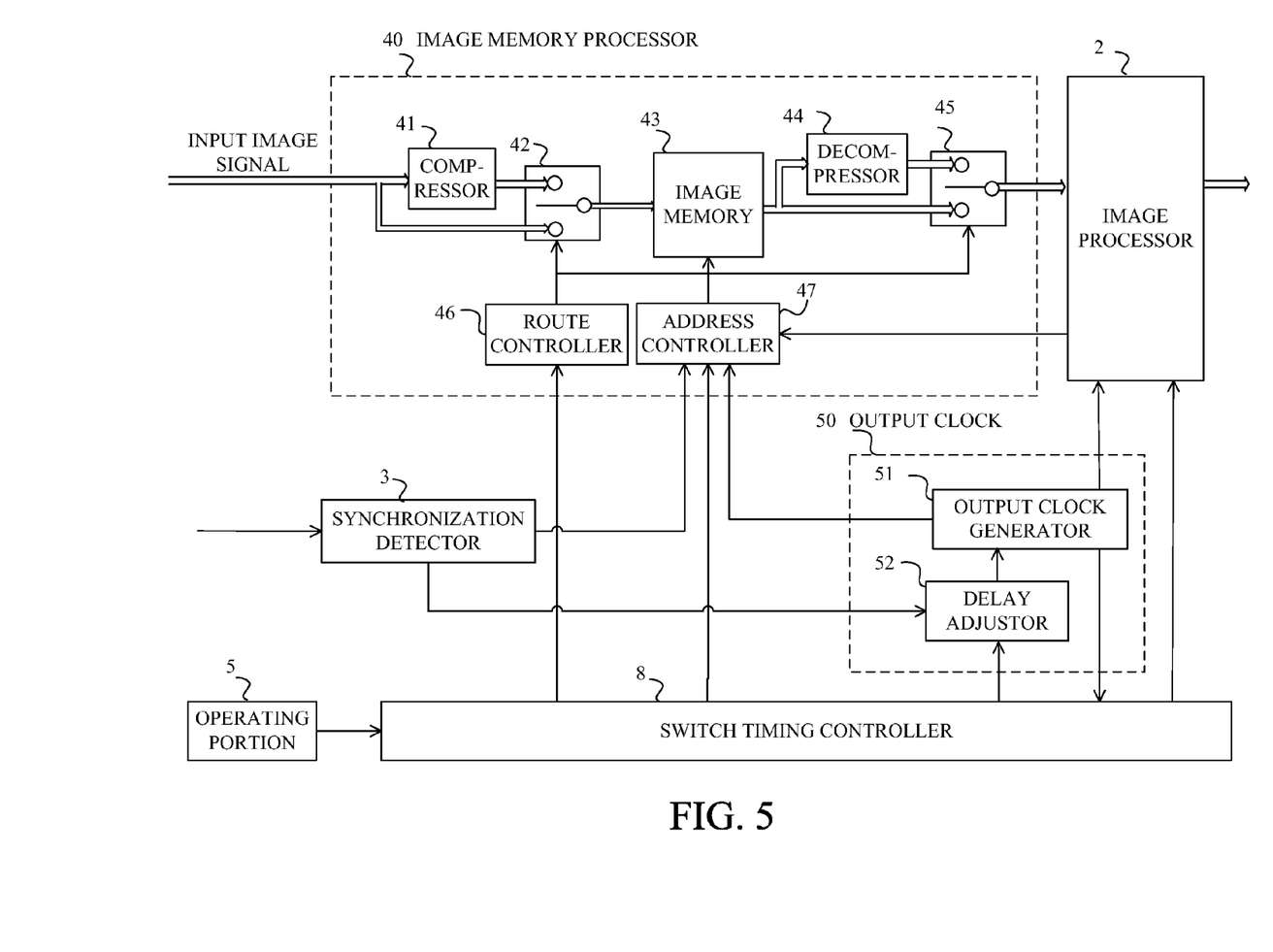
FIG. 5 is a block diagram illustrating a configuration of an image display apparatus that is Embodiment 3 of the present invention.

FIG. 5 illustrates a configuration of a part related to a processing of an image signal (an image data) of an image display apparatus that is Embodiments 3 of the present invention. The image display apparatus includes an image memory processor 40, an image processor 2, a synchronization detector 3, an output clock 50, an operating portion 5, and a switch timing controller 8. The image processor 2, the synchronization detector 3, and the operating part 5 are the same as those of Embodiments 1 and 2.

The image memory processor 40, as indicated by a dashed line in FIG. 5, includes a compressor 41, a compression application switch 42, an image memory 43, a decompressor 44, a decompression application switch 45, a route controller 46, and an address controller 47. The image memory processor 40 is different from the image memory processor 30 of Embodiment 2 in that the route controller 46 is provided.

The route controller 46 switches the compression/decompression route in which the compression application switch 42 is set to the compression route and the decompression application switch 45 is set to the decompression route and the detour route in which both the compression application switch 42 and the decompression application switch 45 are set to the detour route. The switching of the route is controlled by the switch timing controller 8.

The output clock 50, as indicated by a dashed line in FIG. 5, includes an output clock generator 51 and a delay adjustor 52. The output clock 50 outputs a pixel clock that operates the image memory 43 and each latter part of it, a horizontal synchronization signal, and a vertical synchronization signal that is capable of arbitrarily setting a phase with the same cycle as that of the inputted vertical synchronization signal.

The output clock generator 51 outputs a pixel clock that operates the image memory 43 and each latter part of it, a horizontal synchronization signal, and a vertical synchronization signal generated with the cycle and the phase specified by the delay adjustor 52.

The delay adjustor 52 tunes the cycle of the vertical synchronization signal outputted from the output clock generator 51 to the cycle of the vertical synchronization signal outputted from the synchronization detector 3, and sets the phase arbitrarily. As for the phase, an appropriate amount is specified so as not to generate a tearing (a phenomenon in which images of frames different between the top and the bottom of a certain line as a boundary are displayed) by the switch timing controller 8. In the present embodiment, a normal delay mode in which a delay time having a sufficient margin is set and a low delay mode in which a delay time shorter than the normal delay mode (for example, the minimum delay time that can be set) can be specified.

The switch timing controller 8, regarding the input from the operating portion 5 as a trigger, instructs the selection (the switch) of the access mode of the image memory 1 and the routes of the compression application switch 42 and the decompression application switch 45, and also sets the magnification of the reduction or the enlargement to the image processor 2.

Next, referring to FIGS. 6A and 6B, the timing (a control method) of performing the switches of the access mode and the compression and decompression/detour route by the switch timing controller 8 will be described. The switch timing controller 8 performs the following processing (step) in accordance with a computer program stored in an embedded memory.

Figure 6A:
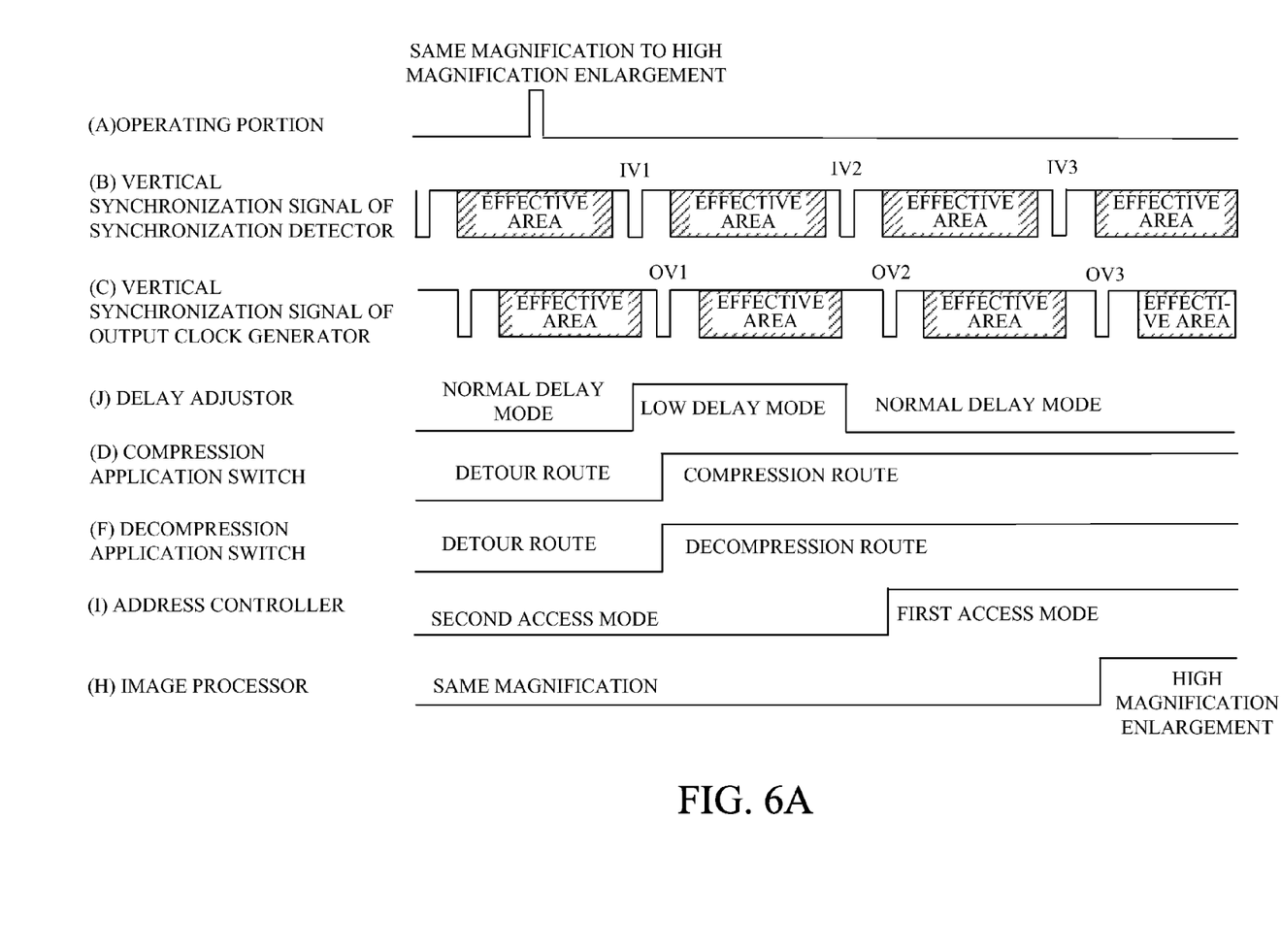
FIGS. 6A and 6B are diagrams illustrating switch timings in the image display apparatus of Embodiment 3.

FIG. 6A illustrates operation timings of (J) the delay adjustor 52, (D) the compression application switch 42, (F) the decompression application switch 45, (I) the address controller 47, and (H) the image processor 2 when the operation of instructing the enlargement from the same magnification to the high magnification is performed by (A) the operating portion 5. The processing of FIG. 6A corresponds to claims 3, 4, and 9.

Each operation timing needs to be performed during a vertical blanking period (an input vertical blanking period) of the input image signal inputted to the image memory processor 40 and a vertical blanking period (an output vertical blanking period) of the output image signal outputted from the image memory processor 40. Also in the present embodiment, an interrupt by (B) the vertical synchronization signal outputted from the synchronization detector 3 is used as an indicator of an incoming timing of the input vertical blanking period. Moreover, an interrupt by (C) the vertical synchronization signal outputted from the output clock generator 51 is used as an indicator of an incoming timing of the output vertical blanking period.

After the enlargement instruction operation from the same magnification to the high magnification is performed by the operating portion 5, (B) the vertical synchronization signal outputted from the synchronization detector 3 is sequentially defined as IV1, IV2, IV3, IV4, and the like. Furthermore, (C) the vertical synchronization signal outputted from the output clock generator 51 is sequentially defined as OV1, OV2, OV3, OV4, and the like. OV1, OV2, OV3, and OV4 are outputted next to (immediately after) IV1, IV2, IV3, and IV4, respectively. Instead of this, however, OV1, OV2, OV3, and OV4 may be outputted at the same time as IV1, IV2, IV3, and IV4, respectively.

During IV1, (J) the delay adjustor 52 is switched from the normal delay mode to the low delay mode. The switch of the delay mode is promptly applied, and the delay time of immediate OV1 with respect to IV1 is shorter than each of delay times of OV2, OV3, and OV4 other than OV1 (other than the first output vertical blanking period) with respect to each of IV2, IV3, and IV4 just prior to them. In other words, OV1 comes after IV1 faster than OV2, OV3, and OV4 coming after IV2, IV3, and IV4 just prior to them.

During OV1 (the first output vertical blanking period), the route controller 46 is switched from the detour route to the compression and decompression route, and (D) the compression application switch 42 is switched from the detour route to the compression route, and (F) the decompression application switch 45 is switched from the detour route to the decompression route.

During IV2 (the first input vertical blanking period), (J) the delay adjustor 52 is switched from the low delay mode to the normal delay mode. The switch of the delay mode is promptly applied, and immediate OV2 comes after the normal delay time with respect to IV2.

During OV2 (the second output vertical blanking period immediately after the first output/input vertical blanking period), the access mode (the writing/reading mode) for the image memory 43 is switched from the second access mode to the first access mode via (I) the address controller 47.

During OV3, the set magnification in (H) the image processor 2 is switched from the same magnification to the high magnification.

The switch processings of the access mode and the compression and decompression/detour route described above are performed to be able to eliminate or reduce the discontinuity or the disturbance of the image in enlarging the image displayed on the display from the same magnification to the high magnification.

If OV1 comes during the vertical blanking period of the input image signal in the low delay mode, the disturbance of the displayed image is not generated. Even when OV1 is contained in an effective area of the input image signal, the disturbance of the displayed image can be suppressed.

If there is a room for the processing capacity, the processings that are to be performed during OV2 and OV3 are also performed during OV1 to be able to shorten the time required for the total of the switch processings. The processing that is to be performed during OV1 may also be performed during IV2.

Figure 6B:
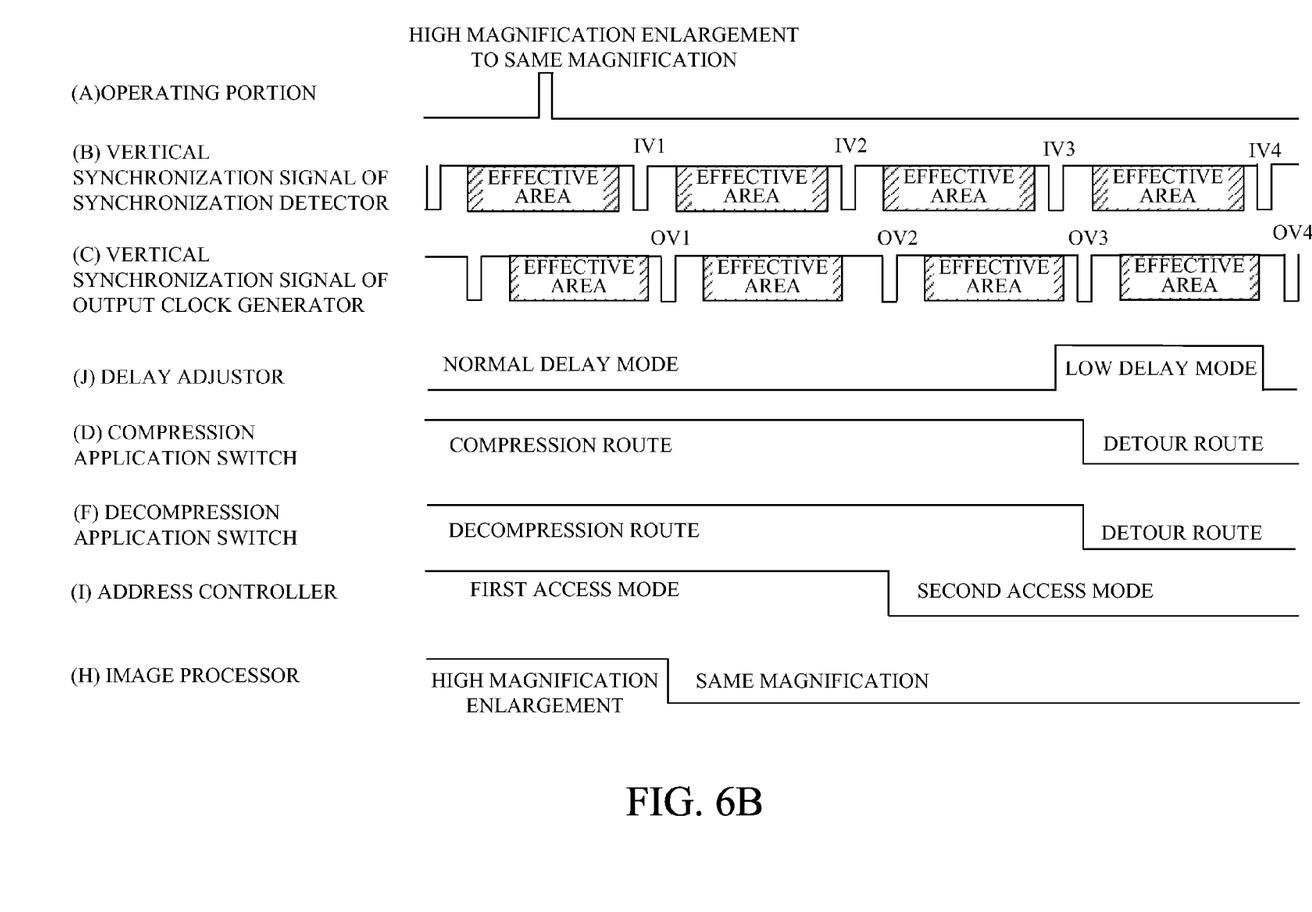

FIG. 6B illustrates operation timings of (J) the delay adjustor 52, (D) the compression application switch 42, (F) the decompression application switch 45, (I) the address controller 47, and (H) the image processor 2 when the operation that instructs the reduction from the high magnification to the same magnification is performed by (A) the operating portion 5. In this case, the switching may be performed in the order reverse of a case where the enlargement instruction operation from the same magnification to the high magnification is performed. The processing in FIG. 6B corresponds to claims 5, 6, and 10.

During OV1, the set magnification in (H) the image processor 2 is switched from the high magnification to the same magnification.

During OV2 (the first output vertical blanking period), the access mode for the image memory 43 (the writing/reading mode) is switched from the first access mode to the second access mode via (I) the address controller 47.

During IV3, (J) the delay adjustor 52 is switched from the normal delay mode to the low delay mode. The switch of the delay mode is promptly applied, and the delay time of immediate OV3 with respect to IV3 is shorter than each of delay times of OV1, OV2, and OV4 other than OV3 (other than the second output vertical blanking period) with respect to each of IV1, IV2, and IV4 just prior to them. In other words, OV3 comes after IV3 earlier than OV1, OV2, and OV4 coming after IV1, IV2, and IV4 just prior to them.

During OV3 (the second output vertical blanking period immediately after the first output vertical blanking period), the route controller 46 is switched from the compression and decompression route to the detour route. As a result, (D) the compression application switch 42 is switched from the compression route to the detour route, and (F) the decompression application switch 45 is switched from the decompression route to the detour route.

During IV4 (the first input vertical blanking period immediately after the second output vertical blanking period), (J) the delay adjustor 52 is switched from the low delay mode to the normal delay mode. The switch of the delay mode is promptly applied, and immediate OV4 comes after the normal delay time with respect to IV4.

The switch processings of the access mode and the compression and decompression/detour route described above are performed to be able to eliminate or reduce the discontinuity or the disturbance of the image in reducing the image displayed on the display from the high magnification to the same magnification.

If OV3 comes during the vertical blanking period of the input image signal in the low delay mode, the disturbance of the displayed image is not generated. Even when OV3 is contained in an effective area of the input image signal, the disturbance of the displayed image can be suppressed.

If there is a room for the processing capacity, the processing that is to be performed during OV2 are also performed during OV1 to be able to shorten the time required for the total of the switch processings. The processing that is to be performed during OV3 may also be performed during IV4.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, each embodiment describes the case where the image processor 2 performs a resolution conversion processing, but the image processor 2 may also perform a keystone correction processing since the similar restriction can be provided to the access mode in accordance with a value of a correction angle in the keystone correction processing.

This application claims the benefit of Japanese Patent Application No. 2010-068009, filed on Mar. 24, 2010, which is hereby incorporated by reference herein in its entirety.

What is claimed is:

1. An image display apparatus comprising:
a memory including a first mode in which an image data is sequentially written and read per frame and a second mode in which the image data is sequentially written and read per sub-frame area obtained by dividing the frame;
a compressor capable of switching a compression output state in which a compression image data generated by compressing an input image data is outputted and an uncompressed output state in which an uncompressed image data without compressing the input image data is outputted as the image data written in the memory;
a decompressor capable of switching a decompression output state in which the compression image data read from the memory is decompressed to be outputted and a non-decompression output state in which the uncompressed image data read from the memory is not decompressed to be outputted; and
a controller configured to switch the compressor from the uncompressed output state to the compression output state during a first input vertical blanking period, switch the decompressor from the non-decompression output state to the decompression output state at the same time as the first input vertical blanking period or during a first output vertical blanking period immediately after the first input vertical blanking period, and switch the memory from the second mode to the first mode during the first output vertical blanking period or a second output vertical blanking period immediately after the first output vertical blanking period, where a vertical blanking period of an input image to the compressor is defined as an input vertical blanking period and a vertical blanking period of an output image from the decompressor is defined as an output vertical blanking period.

2. An image display apparatus comprising:
a memory including a first mode in which an image data is sequentially written and read per frame and a second mode in which the image data is sequentially written and read per sub-frame area obtained by dividing the frame;
a compressor capable of switching a compression output state in which a compression image data generated by compressing an input image data is outputted and an uncompressed output state in which an uncompressed image data without compressing the input image data is outputted as the image data written in the memory;
a decompressor capable of switching a decompression output state in which the compression image data read from the memory is decompressed to be outputted and a non-decompression output state in which the uncompressed image data read from the memory is not decompressed to be outputted; and
a controller configured to switch the memory from the first mode to the second mode during a first output vertical blanking period, switch the compressor from the compression output state to the uncompressed output state during a first input vertical blanking period immediately after the first output vertical blanking period, and switch the decompressor from the decompression output state to the non-decompression output state at the same time as the first input vertical blanking period or during a second output vertical blanking period immediately after the first input vertical blanking period, where a vertical blanking period of an input image to the compressor is defined as an input vertical blanking period and a vertical blanking period of an output image from the decompressor is defined as an output vertical blanking period.

3. An image display apparatus comprising:
a memory including a first mode in which an image data is sequentially written and read per frame and a second mode in which the image data is sequentially written and read per sub-frame area obtained by dividing the frame;
a compressor capable of switching a compression output state in which a compression image data generated by compressing an input image data is outputted and an uncompressed output state in which an uncompressed image data without compressing the input image data is outputted as the image data written in the memory;

a decompressor capable of switching a decompression output state in which the compression image data read from the memory is decompressed to be outputted and a non-decompression output state in which the uncompressed image data read from the memory is not decompressed to be outputted; and a controller configured to switch the compressor from the uncompressed output state to the compression output state and also switch the decompressor from the non-decompression output state to the decompression output state during a first output vertical blanking period or a first input vertical blanking period, and switch the memory from the second mode to the first mode during the first output vertical blanking period and a second output vertical blanking period immediately after the first input vertical blanking period, where a vertical blanking period of an input image to the compressor is defined as an input vertical blanking period and a vertical blanking period of an output image from the decompressor is defined as an output vertical blanking period.

4. The image display apparatus according to claim 3, further comprising a delay adjustor configured to adjust a delay time of the first output vertical blanking period with respect to an input vertical blanking period just prior to the first output vertical blanking period so as to be shorter than a delay time of an output vertical blanking period other than the first output vertical blanking period with respect to an input vertical blanking period just prior to the output vertical blanking period, wherein the controller switches the compressor from the uncompressed output state to the compression output state and also switches the decompressor from the non-decompression output state to the decompression output state during the first output vertical blanking period.

5. An image display apparatus comprising:

a memory including a first mode in which an image data is sequentially written and read per frame and a second mode in which the image data is sequentially written and read per sub-frame area obtained by dividing the frame;

a compressor capable of switching a compression output state in which a compression image data generated by compressing an input image data is outputted and an uncompressed output state in which an uncompressed image data without compressing the input image data is outputted as the image data written in the memory;

a decompressor capable of switching a decompression output state in which the compression image data read from the memory is decompressed to be outputted and a non-decompression output state in which the uncompressed image data read from the memory is not decompressed to be outputted; and a controller configured to switch the memory from the first mode to the second mode during a first output vertical blanking period, and switch the compressor from the compression output state to the uncompressed output state and also switch the decompressor from the decompression output state to the non-decompression output state during a second output vertical blanking period immediately after the first output vertical blanking period or a first input vertical blanking period immediately after the second output vertical blanking period, where a vertical blanking period of an input image to the compressor is defined as an input vertical blanking period and a vertical blanking period of an output image from the decompressor is defined as an output vertical blanking period.

6. The image display apparatus according to claim 5, further comprising a delay adjustor configured to adjust a delay time of the second output vertical blanking period with respect to an input vertical blanking period just prior to the second output vertical blanking period so as to be shorter than a delay time of an output vertical blanking period other than the second output vertical blanking period with respect to an input vertical blanking period just prior to the output vertical blanking period, wherein the controller switches the compressor from the compression output state to the uncompressed output state and also switches the decompressor from the decompression output state to the non-decompression output state during the second output vertical blanking period.

7. A method of controlling an image display apparatus comprising a memory including a first mode in which an image data is sequentially written and read per frame and a second mode in which the image data is sequentially written and read per sub-frame area obtained by dividing the frame, a compressor capable of switching a compression output state in which a compression image data generated by compressing an input image data is outputted and an uncompressed output state in which an uncompressed image data without compressing the input image data is outputted as the image data written in the memory, and a decompressor capable of switching a decompression output state in which the compression image data read from the memory is decompressed to be outputted and a non-decompression output state in which the uncompressed image data read from the memory is not decompressed to be outputted, the method comprising the steps of:

switching the compressor from the uncompressed output state to the compression output state during a first input vertical blanking period;

switching the decompressor from the non-decompression output state to the decompression output state at the same time as the first input vertical blanking period or during a first output vertical blanking period immediately after the first input vertical blanking period; and switching the memory from the second mode to the first mode during the first output vertical blanking period or a second output vertical blanking period immediately after the first output vertical blanking period, where a vertical blanking period of an input image to the compressor is defined as an input vertical blanking period and a vertical blanking period of an output image from the decompressor is defined as an output vertical blanking period.

8. A method of controlling an image display apparatus comprising a memory including a first mode in which an image data is sequentially written and read per frame and a second mode in which the image data is sequentially written and read per sub-frame area obtained by dividing the frame, a compressor capable of switching a compression output state in which a compression image data generated by compressing an input image data is outputted and an uncompressed output state in which an uncompressed image data without compressing the input image data is outputted as the image data written in the memory, and a decompressor capable of switching a decompression output state in which the compression image data read from the memory is decompressed to be outputted and a non-decompression output state in which the uncompressed image data read from the memory is not decompressed to be outputted, the method comprising the steps of:

switching the memory from the first mode to the second mode during a first output vertical blanking period;

switching the compressor from the compression output state to the uncompressed output state during a first input vertical blanking period immediately after the first output vertical blanking period; and switching the decompressor from the decompression output state to the non-decompression output state at the same time as the first input vertical blanking period or during a second output vertical blanking period immediately after the first input vertical blanking period, where a vertical blanking period of an input image to the compressor is defined as an input vertical blanking period and a vertical blanking period of an output image from the decompressor is defined as an output vertical blanking period.

9. A method of controlling an image display apparatus comprising a memory including a first mode in which an image data is sequentially written and read per frame and a second mode in which the image data is sequentially written and read per sub-frame area obtained by dividing the frame, a compressor capable of switching a compression output state in which a compression image data generated by compressing an input image data is outputted and an uncompressed output state in which an uncompressed image data without compressing the input image data is outputted as the image data written in the memory, and a decompressor capable of switching a decompression output state in which the compression image data read from the memory is decompressed to be outputted and a non-decompression output state in which the uncompressed image data read from the memory is not decompressed to be outputted, the method comprising the steps of:

switching the compressor from the uncompressed output state to the compression output state and also switching the decompressor from the non-decompression output state to the decompression output state during a first output vertical blanking period or a first input vertical blanking period; and switching the memory from the second mode to the first mode during the first output vertical blanking period and a second output vertical blanking period immediately after the first input vertical blanking period, where a vertical blanking period of an input image to the compressor is defined as an input vertical blanking period and a vertical blanking period of an output image from the decompressor is defined as an output vertical blanking period.

10. A method of controlling an image display apparatus comprising a memory including a first mode in which an image data is sequentially written and read per frame and a second mode in which the image data is sequentially written and read per sub-frame area obtained by dividing the frame, a compressor capable of switching a compression output state in which a compression image data generated by compressing an input image data is outputted and an uncompressed output state in which an uncompressed image data without compressing the input image data is outputted as the image data written in the memory, and a decompressor capable of switching a decompression output state in which the compression image data read from the memory is decompressed to be outputted and a non-decompression output state in which the uncompressed image data read from the memory is not decompressed to be outputted, the method comprising the steps of:

switching the memory from the first mode to the second mode during a first output vertical blanking period; and switching the compressor from the compression output state to the uncompressed output state and also switching the decompressor from the decompression output state to the non-decompression output state during a second output vertical blanking period immediately after the first output vertical blanking period or a first input vertical blanking period immediately after the second output vertical blanking period, where a vertical blanking period of an input image to the compressor is defined as an input vertical blanking period and a vertical blanking period of an output image from the decompressor is defined as an output vertical blanking period.

* * * * *